US007948889B2

(12) United States Patent
Lalonde et al.

(10) Patent No.: US 7,948,889 B2
(45) Date of Patent: May 24, 2011

(54) METHOD AND SYSTEM FOR ANALYZING NETWORK TRAFFIC

(75) Inventors: Chris Lalonde, Campbell, CA (US);
Mat Henley, San Francisco, CA (US);
Andy Brown, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1113 days.

(21) Appl. No.: 10/954,449

(22) Filed: Sep. 29, 2004

(65) Prior Publication Data

US 2006/0067216 A1    Mar. 30, 2006

(51) Int. Cl.
*H04L 12/26* (2006.01)
(52) U.S. Cl. .......................... 370/235; 370/252; 726/26
(58) Field of Classification Search .................. 370/229, 370/235, 252, 253; 726/23
See application file for complete search history.

(56) References Cited

U.S. PATENT DOCUMENTS

| | | | | |
|---|---|---|---|---|
| 5,404,461 | A * | 4/1995 | Olnowich et al. | 710/316 |
| 6,381,242 | B1 * | 4/2002 | Maher et al. | 370/394 |
| 6,578,147 | B1 * | 6/2003 | Shanklin et al. | 726/22 |
| 7,366,894 | B1 * | 4/2008 | Kalimuthu et al. | 713/153 |
| 7,567,523 | B2 * | 7/2009 | Black et al. | 370/255 |
| 2003/0009699 | A1 * | 1/2003 | Gupta et al. | 713/201 |
| 2003/0123442 | A1 * | 7/2003 | Drucker et al. | 370/392 |
| 2005/0044406 | A1 * | 2/2005 | Stute | 713/201 |
| 2005/0078667 | A1 * | 4/2005 | Brown | 370/388 |
| 2005/0160289 | A1 * | 7/2005 | Shay | 713/201 |
| 2005/0207420 | A1 * | 9/2005 | Shanklin et al. | 370/392 |
| 2006/0056424 | A1 * | 3/2006 | Lih et al. | 370/401 |
| 2007/0168452 | A1 * | 7/2007 | Winter | 709/213 |

* cited by examiner

*Primary Examiner* — Ricky Ngo
*Assistant Examiner* — Gary Mui
(74) *Attorney, Agent, or Firm* — Schwegman, Lundberg & Woessner, P.A.

(57) ABSTRACT

A method and system for analyzing network traffic are provided. A network traffic analyzer includes a plurality of data switching devices connected to a plurality of data hubs. Each data hub may have multiple input ports and multiple output ports and may be configured to broadcast all data packets received at an input port to all output ports. Each data switching device may be configurable to forward data packets to an input port of any one of the plurality of data hubs, any subset of the plurality of data hubs, or all data hubs of the plurality of data hubs, based on a characteristic of one or more data packets. Furthermore, at least one network sensor device may be connected to an output port of a data hub of the plurality of data hubs. The network sensor device may be configured to analyze data packets in real time for, among other purposes, detecting network intrusions.

19 Claims, 11 Drawing Sheets

RECEIVE NETWORK TRAFFIC (e.g., DATA PACKETS) AT A PLURALITY OF DATA SWITCHING DEVICES, EACH DATA SWITCHING DEVICE CONNECTED TO A PLURALITY OF DATA HUBS IN A FULLY-MESHED NETWORK CONFIGURATION, SO THAT EACH DATA SWITCHING DEVICE IS CONFIGURABLE TO FORWARD DATA PACKETS TO ANY ONE OF THE PLURALITY OF DATA HUBS, ANY SUBSET OF THE PLURALITY OF DATA HUBS, OR ALL DATA HUBS OF THE PLURALITY OF DATA HUBS 70

↓

BASED ON A CHARACTERISTIC OF THE NETWORK TRAFFIC, FORWARD THE NETWORK TRAFFIC TO ONE OF THE PLURALITY OF DATA HUBS, A SUBSET OF THE PLURALITY OF DATA HUBS, OR ALL OF THE DATA HUBS OF THE PLURALITY OF DATA HUBS 72

↓

RECEIVE NETWORK TRAFFIC AT A DATA HUB 80

↓

FORWARD DATA PACKETS TO A NETWORK SENSOR CONNECTED TO THE DATA HUB 82

↓

RECEIVE NETWORK TRAFFIC AT A NETWORK SENSOR 84

↓

ANALYZE THE NETWORK TRAFFIC IN REAL TIME TO DETERMINE WHETHER A NETWORK INTRUSION HAS OCCURRED 86

METHOD AND SYSTEM FOR ANALYZING NETWORK TRAFFIC

FIELD OF THE INVENTION

Exemplary embodiments of the present invention relate generally to the field of network security and, in one exemplary embodiment, to methods and systems for analyzing network traffic for the purpose of detecting network intrusions.

BACKGROUND OF THE INVENTION

The success of any online enterprise is very much dependent on the stability and security of its computer networks. For an online enterprise, a network outage may be embarrassing, but more importantly, it can be potentially very costly. Consequently, online enterprises spend hundreds of thousands of dollars on protecting their networks from the wide variety of intrusive network activities that can temporarily slow down, or even take down, a computer network.

Online enterprises utilize a wide variety of protective measures to prevent unauthorized and unwanted network activities on their computer networks. For example, on the least sophisticated end of the scale is the ubiquitous username and password protection scheme. While password protection schemes are effective to a certain degree in protecting select computer resources from unauthorized access, password protection schemes are useless against other unwanted network activities, such as a denial of service (DoS) attack.

A far more sophisticated and effective protective measure that is almost universally utilized by online enterprises is a firewall system. However, a addition, firewalls are generally not effective against network attacks that originate locally, on the protected side of the firewall. Furthermore, firewalls sometimes fail. Therefore, many online enterprises go a step further and utilize network sensor devices, commonly referred to as network intrusion detection systems (IDSs), to detect and prevent network attacks.

Figure 1:
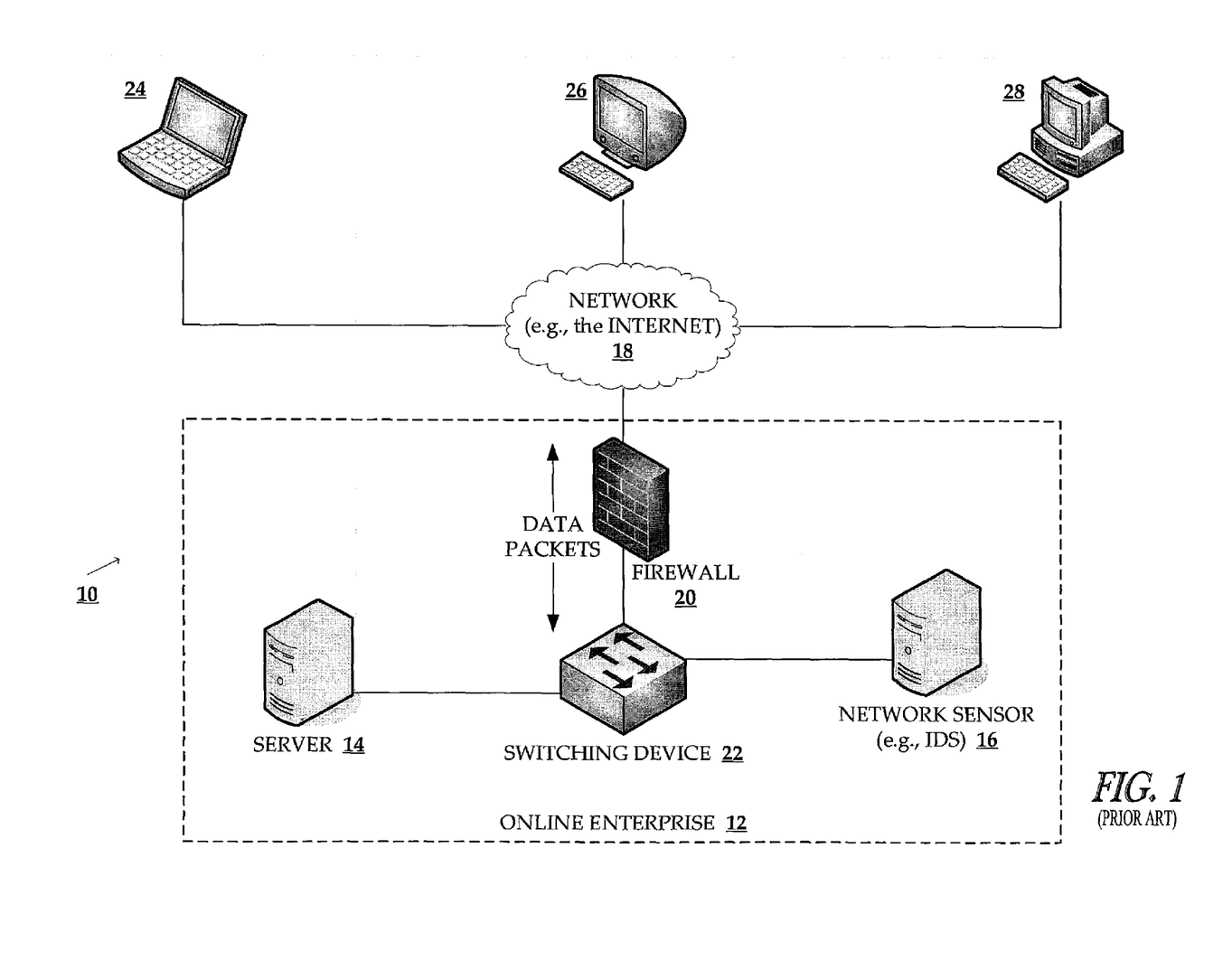
FIG. 1 illustrates an example of a computer network environment including an online enterprise with a network intrusion detection system.

FIG. 1 illustrates an example of a simple network environment 10 including an online enterprise 12 with a single server 14 protected by a network IDS 16. As illustrated in FIG. 1, the server 14 is connected to the Internet 18 via a firewall 20 and a switching device 22. The network IDS 16 is connected to a special port (e.g., a monitoring port) on the switching device 22 that mirrors all incoming and outgoing traffic to any device connected to the port, thereby making it possible for the network IDS 16 to receive and analyze all network traffic (e.g., data packets) that are communicated between any one of the computer devices 24, 26, 28 and the server 14. By analyzing all incoming and outgoing network traffic, the network IDS 16 is able to detect network attacks. Unfortunately, it is extremely uncommon for an online enterprise to have a network as simple as that presented in FIG. 1.

Figure 2:
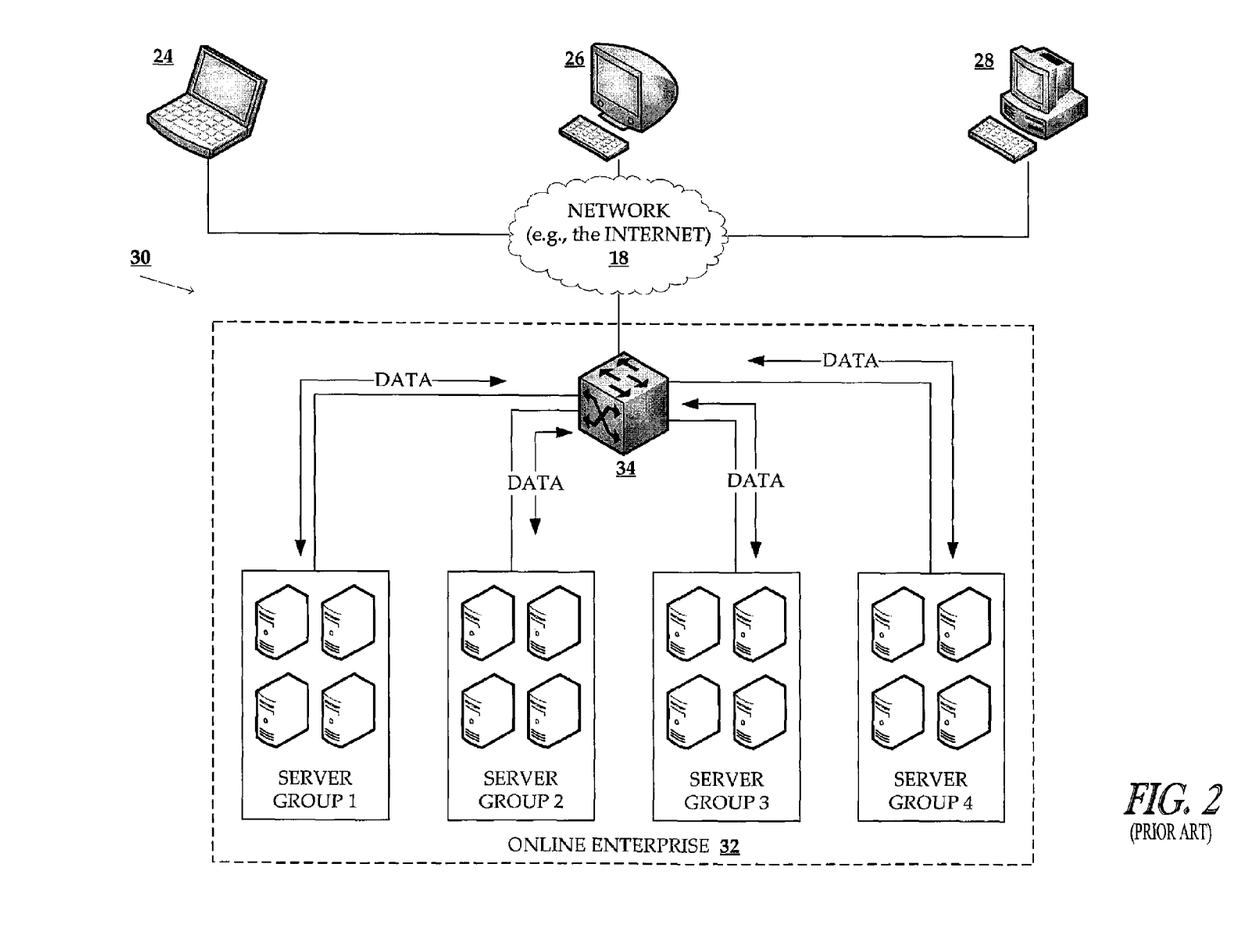
FIG. 2 illustrates an example of a computer network environment including an online enterprise having a computer network with multiple network segments.

FIG. 2 illustrates an example of a network environment 30 including an online enterprise 32 having a slightly more complex network structure than that of FIG. 1. The online enterprise 32 illustrated in FIG. 2 includes four different server groups, each server group representing a different network segment. Each network segment is connected to the Internet 18 via one or more routers or switching devices, represented in FIG. 2 by the block figure with reference number 34. The switching devices 34 may include a load balancing device that services requests received via the Internet 18 from computer devices 24, 26 and/or 28. For example, when the load balancing device receives a request for a service or resource provided by server group 1, the load balancing device may intelligently forward the request to the server in server group 1 that is most capable of servicing the request.

Implementing a network IDS to detect network attacks for the network structure of the online enterprise 32 illustrated in FIG. 2 presents a variety of challenges. First, the amount of network traffic that flows to and from each of the server groups may be prohibitively voluminous for the use of a single IDS device. For example, a single IDS may not be able to properly process all of the incoming data packets if the rate at which the packets are received outpaces the rate at which the packets are processed. Lost or dropped data packets may result in the inability to detect a network attack. Additionally, even if a single IDS could handle the network traffic flow, there is not a single connection point in the network where the IDS might reside to capture all of the data that flows between each of the four server groups. For example, each of the server groups illustrated in FIG. 2 may be located in a different geographical location, making it difficult to monitor traffic flow from a centralized location. Finally, if an IDS attached to any single network segment were to fail, there would be no quick and easy way to re-route the traffic to a backup IDS device.

SUMMARY OF THE DESCRIPTION

A method and system for analyzing network traffic are provided. A network traffic analyzer, according to one embodiment of the invention, includes a plurality of data switching devices connected to a plurality of data hubs. Each data hub may have multiple input ports and multiple output ports and may be configured to broadcast all data packets received at an input port to all output ports. Each data switching device may be configurable to forward data packets to an input port of any one of the plurality of data hubs, any subset of the plurality of data hubs, or all data hubs of the plurality of data hubs, based on a characteristic of one or more data packets. Furthermore, according to one embodiment of the invention, at least one network sensor device may be connected to an output port of a data hub of the plurality of data hubs. The network sensor device may be configured to analyze data packets in real time for, among other purposes, detecting network intrusions.

Other aspects of the present invention will be apparent from the accompanying figures and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for analyzing network traffic for the detection of network intrusions are described. In the following description, for purposes of explanation, numerous specific details are set forth in order to provide a thorough understanding of the present invention. It will be evident, however, to one skilled in the art that the present invention may be practiced without these specific details.

One embodiment of the present invention provides a method and system for analyzing network traffic (e.g., a network traffic analyzer). For example, according to an embodiment of the invention, network traffic may be analyzed for various purposes, including but not limited to: detecting network intrusions, gathering statistical data, and monitoring network traffic for network planning purposes. The exemplary embodiment provides a system that seeks to be both highly scalable and flexible. For example, as an online enterprise grows, one embodiment of the network traffic analyzer can be easily expanded to meet an increase in network traffic. Furthermore, an embodiment of the present invention may be configured in a wide variety of ways to suit the particular network analysis requirements of many online enterprises. An embodiment also seeks to provide a method and system for analyzing network traffic without interfering with the performance of the enterprise network.

Figure 3:
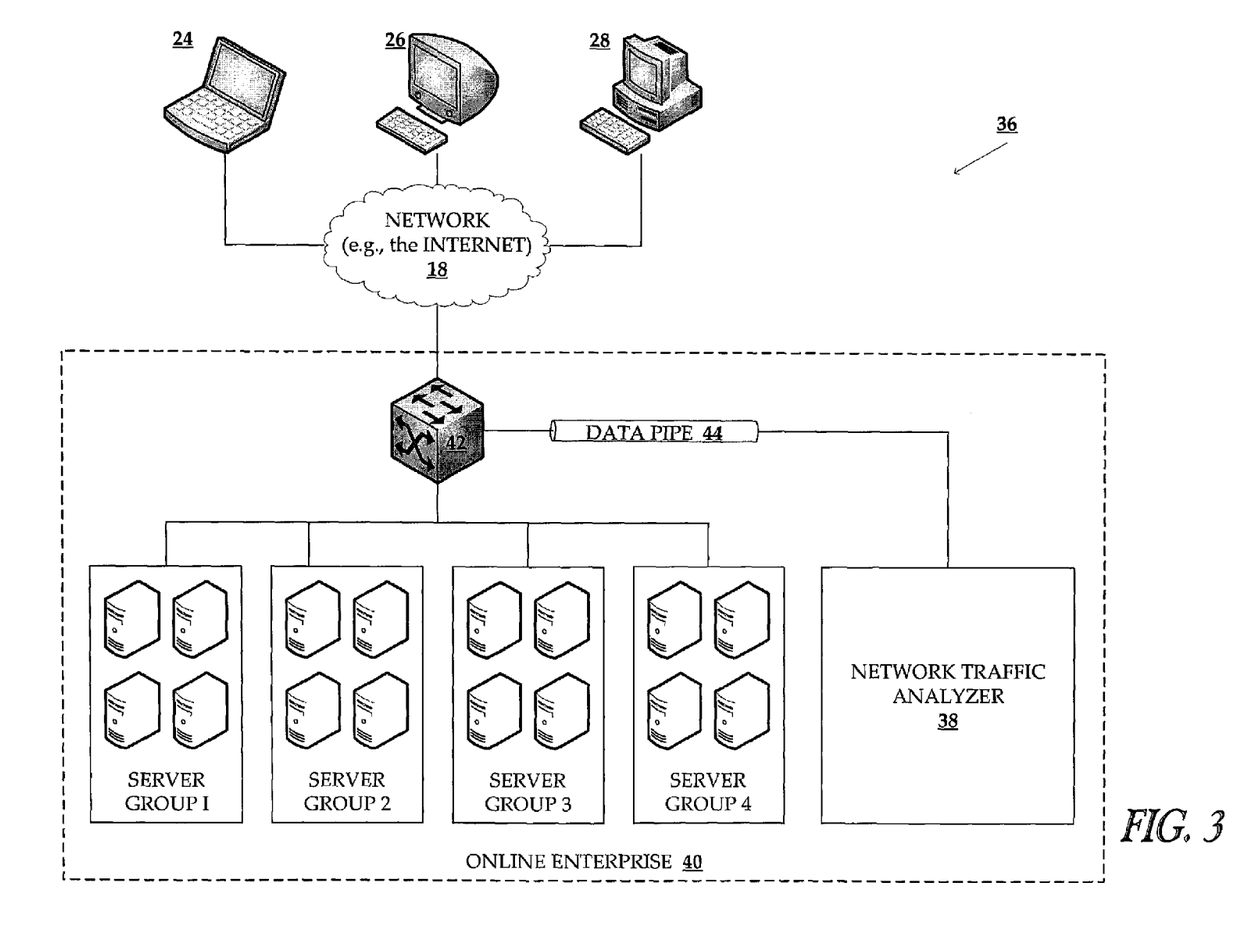
FIG. 3 illustrates a computer network environment including an example of a network traffic analyzer, according to one embodiment of the invention, for analyzing network traffic for an online enterprise with a computer network having multiple network segments.

FIG. 3 illustrates a computer network environment 36 including an example of a network traffic analyzer 38, according to one embodiment of the invention, for analyzing network traffic for an online enterprise 40. As illustrated in FIG. 3, the computer network of the online enterprise 40 includes four groups of servers, server groups 1, 2, 3 and 4. Each group of servers may be connected to the Internet 18 via one or more network devices, represented in FIG. 3 by the network block with reference numeral 42. For example, the network block 42 may include any number of switching devices, routers, hubs, or other network connectivity devices as is necessary to meet the requirements of the particular online enterprise.

In one embodiment of the invention, each of server groups 1, 2, 3 and 4 may perform a different function for an online enterprise. For example, for a network-based ecommerce site, server group 1 may comprise web page servers to serve web pages (e.g., HTML encoded documents) to computer devices 24, 26 and 28. Server group 2 may include image servers to serve images associated with the web pages served by the first server group. In addition, another server group may include servers configured to perform user searches for item listings. As such, in one embodiment, each server group may make up a server cluster that provides a specialized function for the online enterprise.

It will be appreciated that the network configuration of the online enterprise 40 illustrated in FIG. 3 is presented only as an example and the present invention may work equally well with many other network configurations. In particular, the present invention is not dependent on the number of server groups, or the number of servers within a particular server group, but instead, the present invention will work equally well with any number of servers or server groups. Furthermore, it will be appreciated that the configuration of the devices within network block 42 may be, to a certain degree, dependent upon the configuration of the servers and/or server groups. Accordingly, the network block 42 may vary to fit the requirements of a particular network configuration. In alternative configurations, the network block 42 may include: one or more firewall systems; any number of switching devices, such as a traffic management switching device (also referred to as a load-balancing switching device); one or more data taps; and a wide variety of other network connectivity devices. For example, in one embodiment of the invention, the network block 42 may be one or more switching devices, including one or more routers, that forward or route data packets to and from the various servers of server groups 1, 2, 3, and 4. Furthermore, each switching device, or router, may have a special port, commonly referred to as a span port, or a mirror port, that can mirror all network traffic going through the device. In yet another configuration, network block 42 may include one or more data taps, which function to split incoming and outgoing network traffic, directing the network traffic to both the server groups 1, 2, 3 and 4 and the network traffic analyzer 38.

Figure 4:
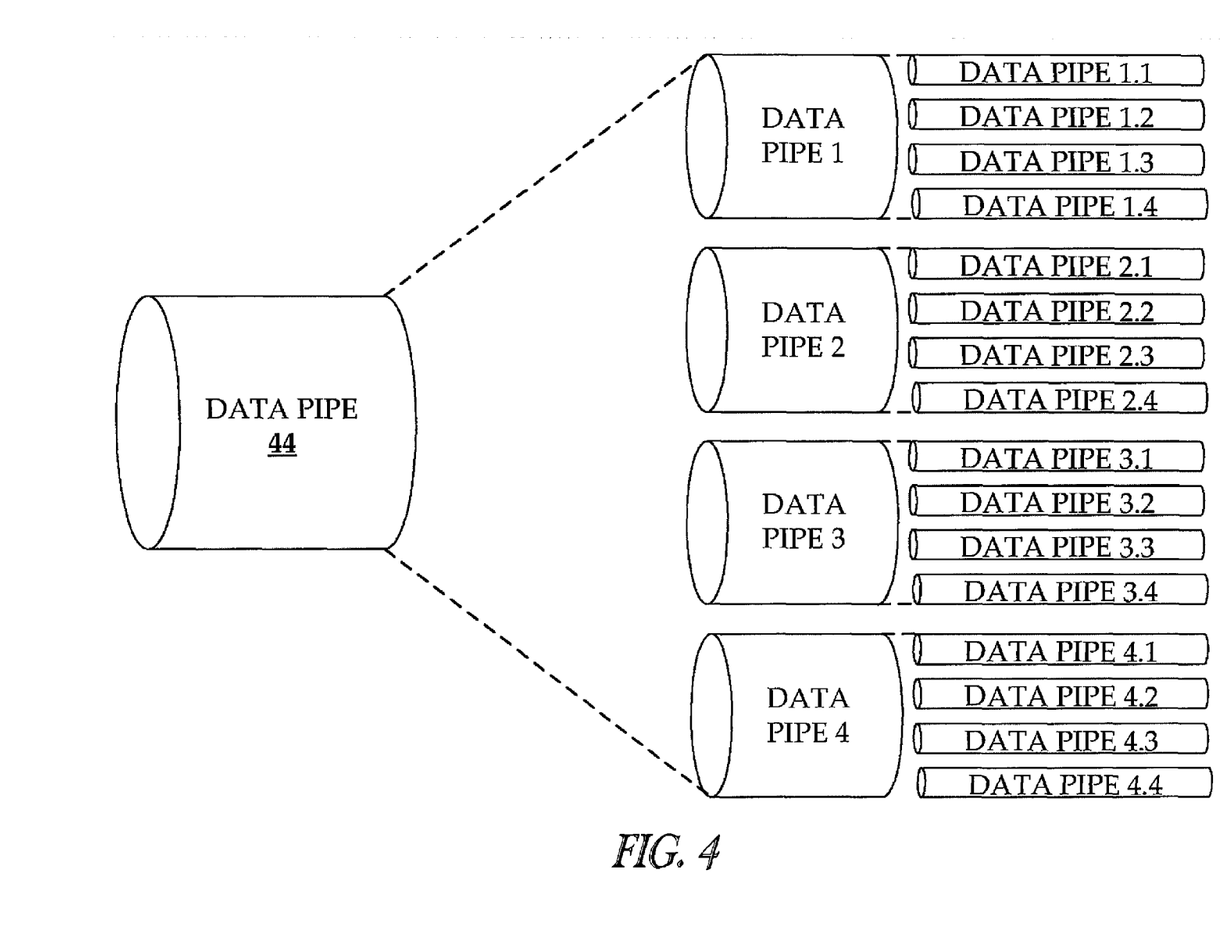
FIG. 4 illustrates an example of a data pipe, according to one embodiment of the invention, for connecting a computer network to a network traffic analyzer.

It will also be appreciated that the data pipe 44 connecting the network traffic analyzer 38 to the network block 42 may include several individual data pipes. For example, as illustrated in FIG. 4, the data pipe 44 may have an individual data pipe for each network segment in the computer network. In one embodiment of the invention, each data switching device within the network block 42 may have a data pipe that connects to the network traffic analyzer 38. In addition, it will be appreciated that the data pipe may be any medium capable of communicating data packets to and from the different network components shown in FIG. 3, including, but not limited to, standard networking cables.

Referring again to FIG. 3, according to one embodiment of the invention, all of the network traffic (e.g., data packets) that flows between the server groups 1, 2, 3 and 4 and the computing devices 24, 26, and 28 is mirrored to the network traffic analyzer 38, where it can be analyzed. Accordingly, if a computer device, such as computer device 24, launches an attack against a specific server, or a specific server group, the data packets that comprise the attack will be communicated to network traffic analyzer 38 where they can be analyzed, and the attack detected.

Figure 5:
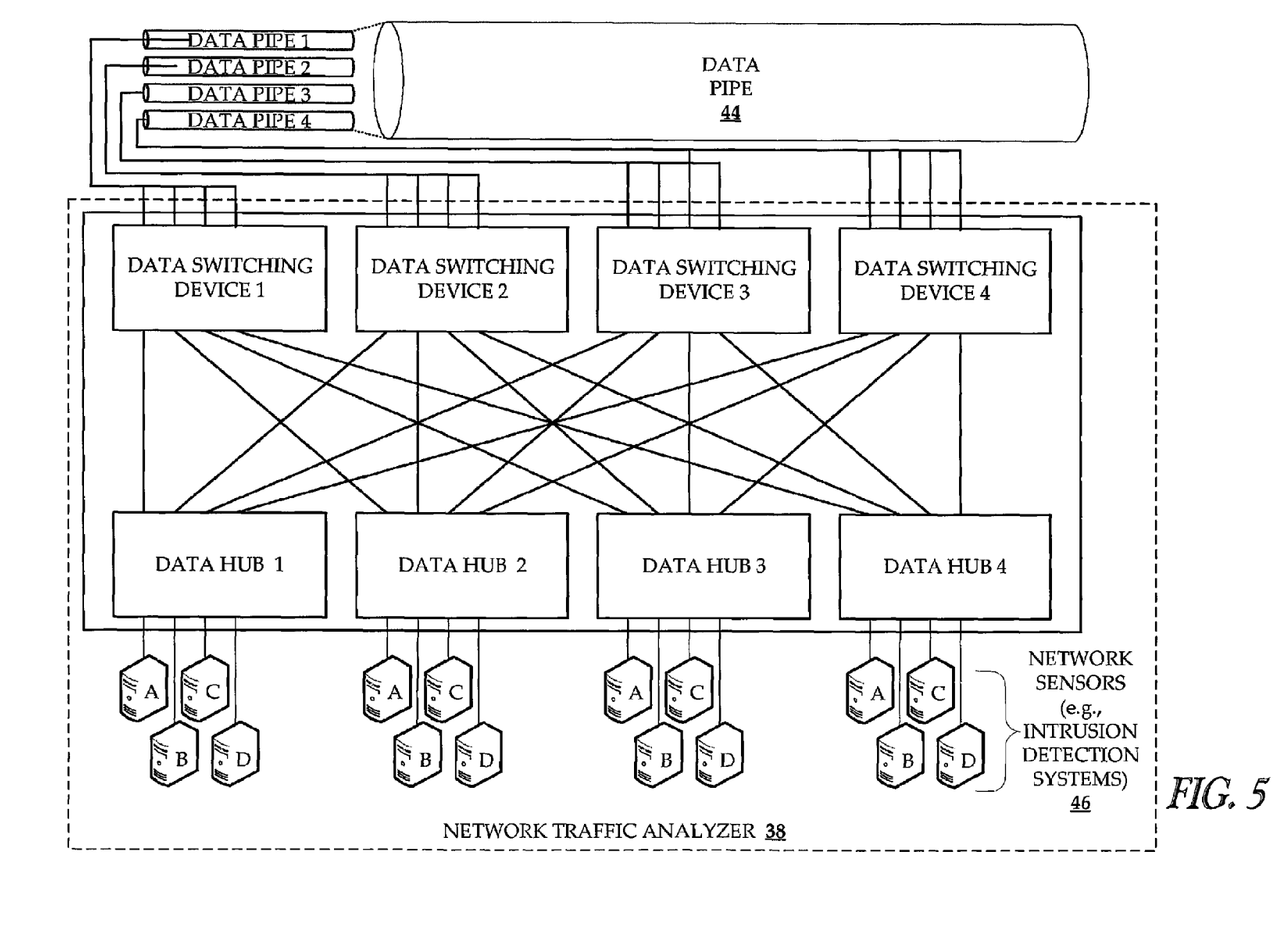
FIGS. 5, 6 and 7 illustrate examples of network traffic analyzers, according to alternative embodiments of the invention.

FIG. 5 illustrates an example of a network traffic analyzer 38, according to one embodiment of the invention. The network traffic analyzer 38 illustrated in FIG. 5 includes four data switching devices (e.g., data switching devices 1, 2, 3 and 4) connected to four data hubs (e.g., data hubs 1, 2, 3 and 4). In addition, four network sensors 46 (e.g., network intrusion detection systems IDS's) are attached to each of the four data hubs.

Figure 8:
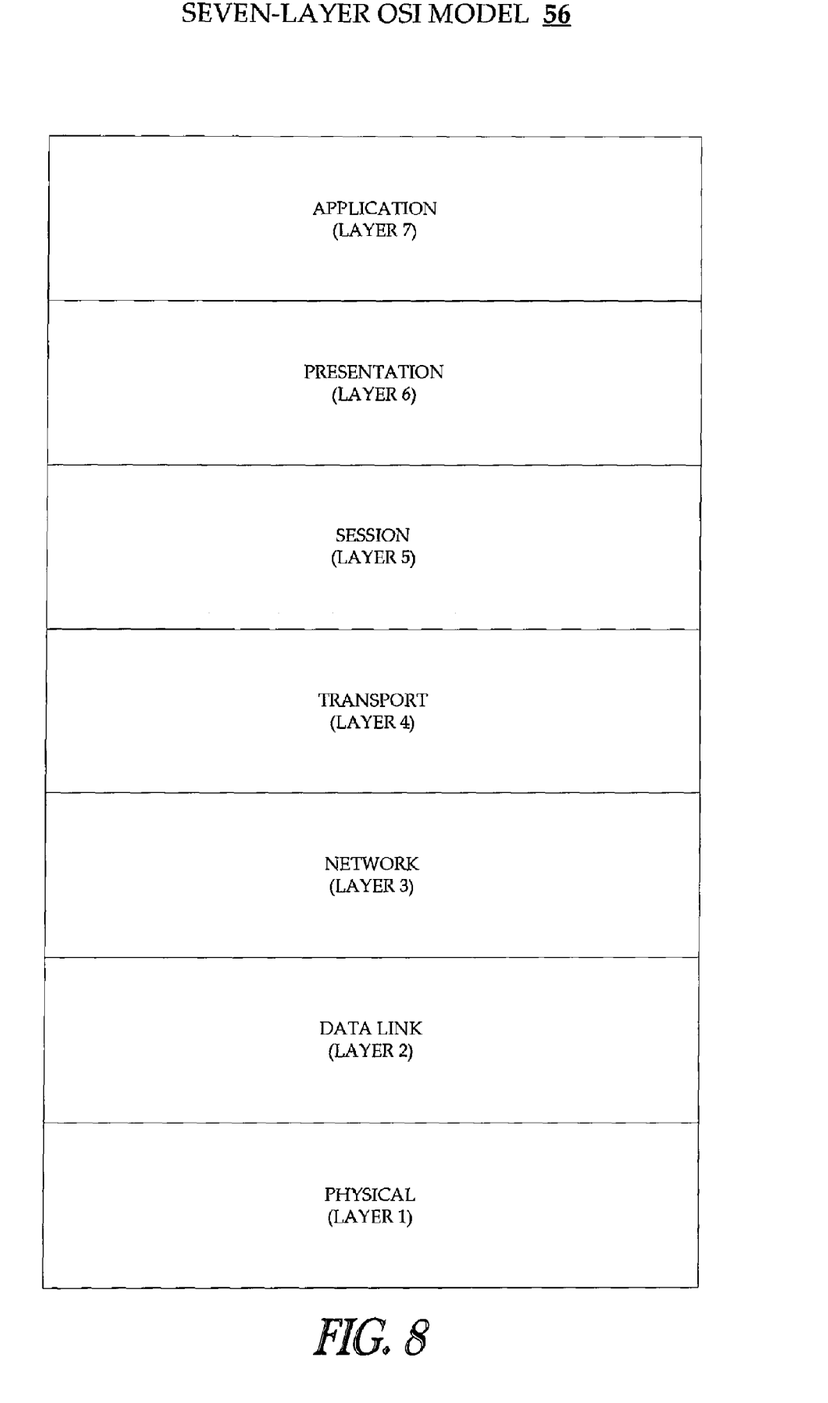
FIG. 8 illustrates an example of the seven-layer Open Systems Interconnection (OSI) model.

In one embodiment of the invention, each data switching device 1, 2, 3, and 4 is a traffic management switching device with advanced packet forwarding, filtering, and/or routing functionality. For example, unlike a traditional switch or router, which forwards packets based on data from layers two and/or three of the seven-layer Open Systems Interconnection (OSI) model 56 (illustrated in FIG. 8), in one embodiment of the invention, each of the data switching devices 1, 2, 3 and 4 are capable of forwarding, filtering, or routing data packets based on content encapsulated in any layer of the seven-layer OSI model 56.

Figure 9:
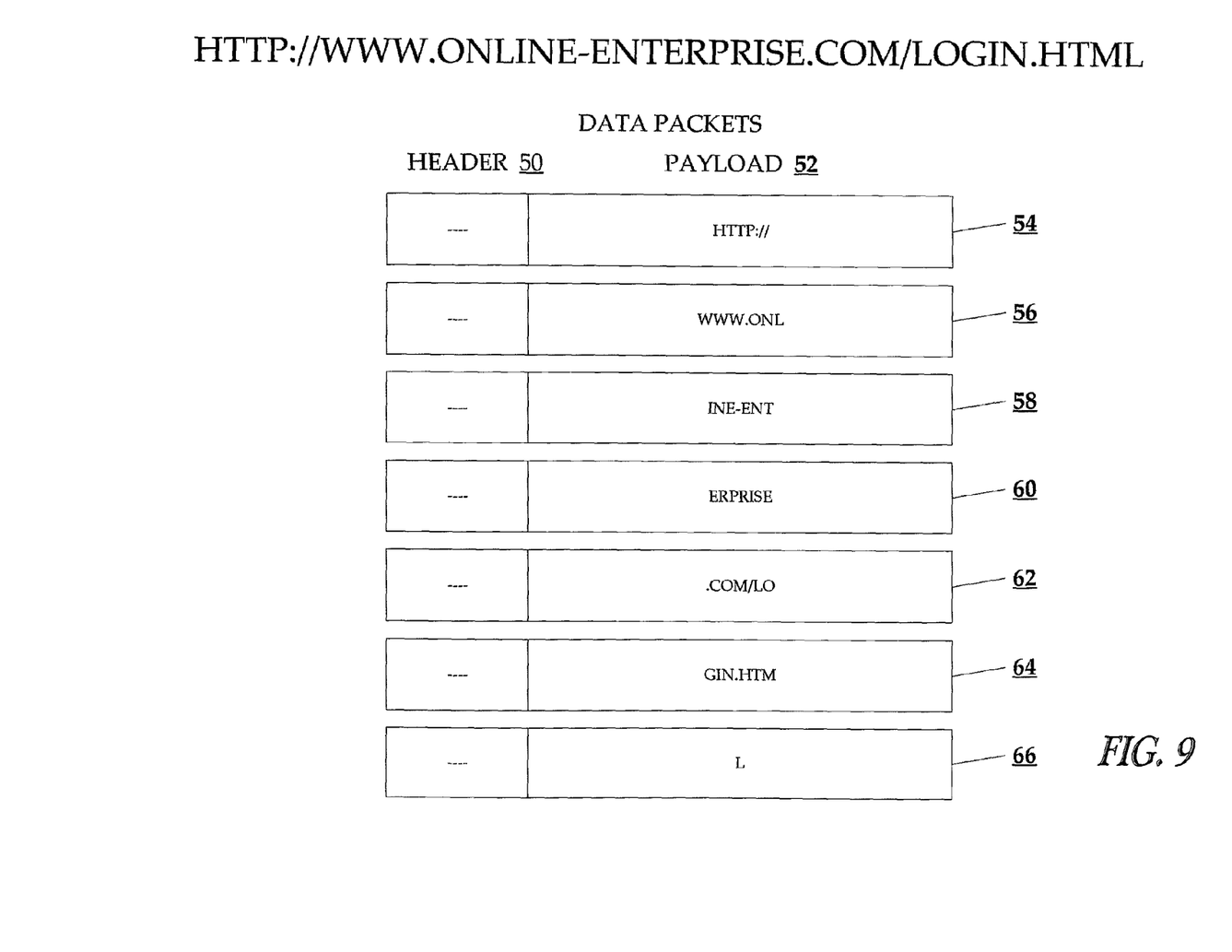
FIG. 9 illustrates an example of how a data message, or data flow, may be broken down into data packets, according to one embodiment of the invention.

In addition, in one embodiment of the invention, each data switching device 1, 2, 3 and 4 may be capable of forwarding, filtering, or routing data packets based on the concept of a data flow. For example, as illustrated in FIG. 9, when a computer device (e.g., computer devices 24, 26, and 28) communicates a data message (e.g., a URL) to the network of the online enterprise 40, the computer device may use standard networking protocols to break down each data message into small data packets with each data packet having a header 50 and a payload 52. In one embodiment of the invention, the data switching devices 1, 2, 3 and 4 may receive the individual data packets 54, 56, 58, 60, 62, 64 and 66, reassemble the data packets into their original sequence and buffer them by placing the sequence of data packets into memory. By intercepting data packets for a specific application data flow, each data switching device 1, 2, 3 and 4 can continue to build the message so the entire contents of the data message can be seen. Consequently, the data switching device can make a decision on where to forward the individual data packets based on the contents of several data packets, or a data flow.

In one embodiment of the invention, the data switching devices 1, 2, 3 and 4 may be configured to analyze data flows (e.g., application data messages) for one or more particular patterns, or search strings (e.g., particular URLs), and when a match occurs, the device may forward all data packets comprising the data flow to a particular data hub 1, 2, 3 or 4 where it is forwarded to one or more network sensors 46 (e.g., IDSs) for analysis. As such, the data switching devices 1, 2, 3 and 4, illustrated in FIG. 5, may forward data packets based on data flows in addition to a characteristic of an individual data packet.

Referring again to FIG. 5, in one embodiment of the invention, each data switching device 1, 2, 3 and 4 may have a plurality of input ports where it receives data packets from a computer network (e.g. from the network block 42) via the data pipe 44. For example, as illustrated in FIG. 5, each data switching device has four input ports to receive incoming data from data pipe 44. In addition, each data switching device 1, 2, 3, and 4, may have a number of output ports for forwarding data packets to one or more data hubs, such as data hubs 1, 2, 3 and 4. In FIG. 5, each data switching device 1, 2, 3 and 4 is shown to have four output ports for forwarding data packets to the data hubs 1, 2, 3 and 4. However, it will be appreciated that in alternative embodiments of the invention, the number of input ports and output ports may vary.

Furthermore, as illustrated in FIG. 5, the data switching devices 1, 2, 3 and 4 are connected to the data hubs 1, 2, 3 and 4 in a fully meshed network configuration. That is, each data switching device 1, 2, 3 and 4 has a connection to each data hub 1, 2, 3 and 4, and each data hub has a connection to each data switching device. Accordingly, each data switching device may be configured to forward, or route, network traffic (e.g., data packets) to any data hub, in any combination. For example, each data switching device may be configured to route data packets of a certain type to one data hub, a subset of all data hubs, or all data hubs. The data switching devices may be highly configurable, thereby allowing the online enterprise to configure the data switching devices to route or forward data packets to the network sensors 46 attached to the data hubs 1, 2, 3 and 4 as the online enterprise sees fit to meet its particular network traffic analysis requirements. Therefore, depending on the location and configuration of the network sensors 46 attached to the data hubs 1, 2, 3 and 4, an online enterprise may configure the data switching devices 1, 2, 3 and 4 to route or forward all traffic to all data hubs, or alternatively, to filter the network traffic and only route a particular type of network traffic to one or more of the data hubs 1, 2, 3 and 4.

In one embodiment of the invention, each of the data hubs 1, 2, 3 and 4 has a plurality of input ports, and a plurality of output ports. For example, as illustrated in FIG. 5, each of the data hubs 1, 2, 3, and 4 has four input ports and four output ports. Accordingly, in one embodiment of the invention, all network traffic that arrives at an input port is forwarded to all output ports. For example, as illustrated in FIG. 5, incoming data packets arriving at any one of the four input ports of data hub 1, from any of data switching devices 1, 2, 3 or 4, are forwarded to the network sensors A, B, C and D, which are connected to the four output ports of data hub 1. Consequently, each of the network sensors A, B, C, and D connected to data hub 1 will receive the exact same network traffic.

In one embodiment of the present invention, the data switching devices 1, 2, 3 and 4 and the network sensors 46 may be configured and arranged according to the particular policy goal of the online enterprise. Accordingly, the plurality of network sensors 46 may be categorized into groups by function, and one network sensor 50 from each group of network sensors (e.g. groups A, B, C and D) may be connected to the same data hub of the plurality of data hubs. For example, each of the data hubs 1, 2, 3 and 4 may have several different network sensors 46 attached, such as the network sensors labeled with reference letters A, B, C and D in FIG. 5. By configuring each of the data switching devices 1, 2, 3 and 4 to forward all network traffic to all data hubs, each of the data hubs 1, 2, 3 and 4 will receive the exact same network traffic. Accordingly, each of the network sensors 46 labeled with reference letter A, which may be a particular type of network sensor for detecting a particular type of network intrusion, will receive the exact same network traffic as each of the other network sensors labeled with reference letters B, C and D. Accordingly, each of the network sensors A, B, C and D may analyze different aspects of the exact same network traffic for detecting different types of network intrusions.

Figure 6:
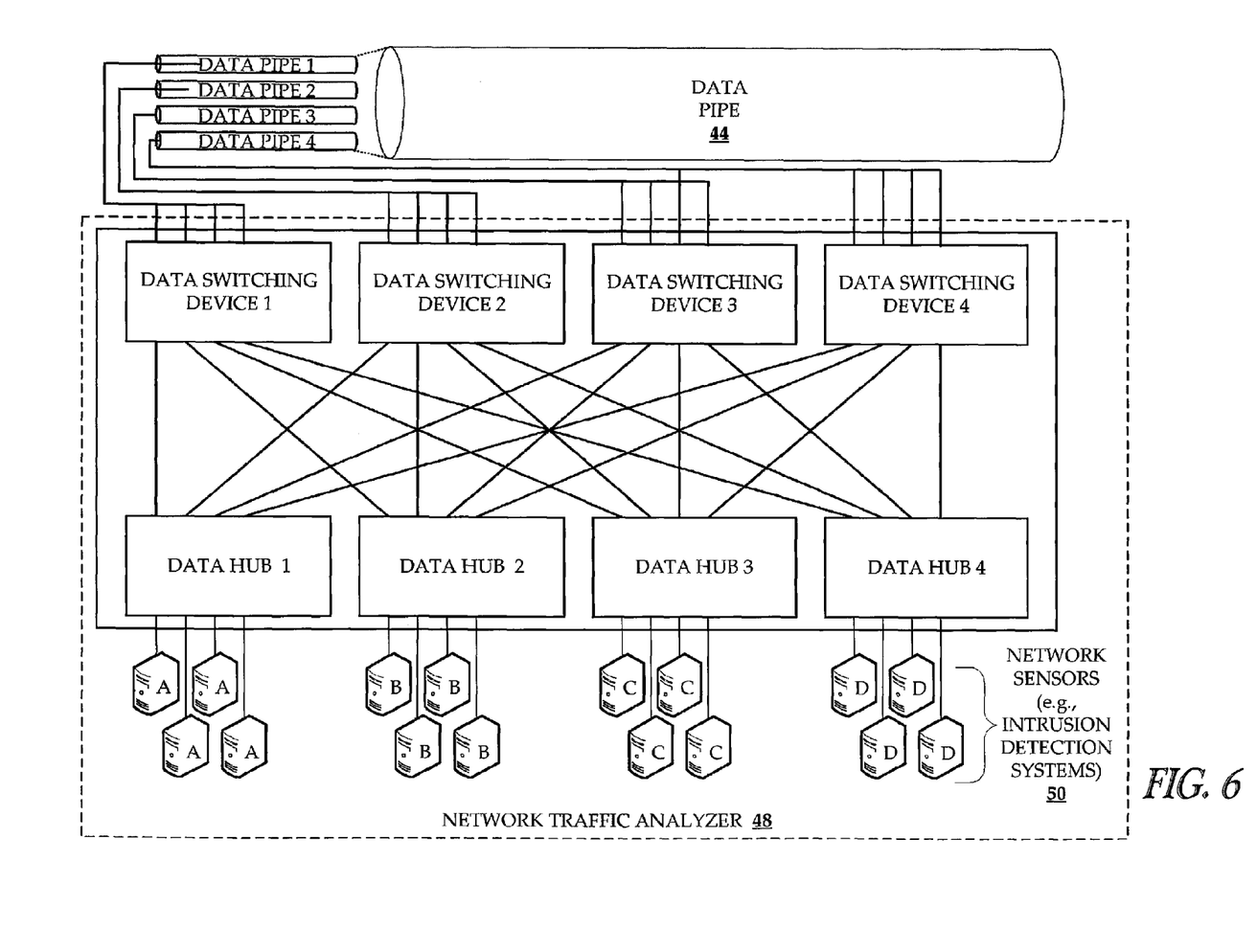

In another scenario, as illustrated in FIG. 6, each of the data switching devices 1, 2 3, and 4 may be configured to forward different types of network traffic to different data hubs. For example, as illustrated in FIG. 6, the network sensors 50 may be categorized into groups by function, and each network sensor 50 within a particular group may be connected to the same data hub of the plurality of data hubs. In one embodiment of the invention, each of the data switching devices 1, 2, 3, and 4 may forward network traffic associated with server group 1 to data hub 1 to be analyzed by the four network sensors 46 labeled with the reference letter A. Similarly, each of the data switching devices 1, 2, 3, and 4 may forward network traffic associated with server group 2 to data hub 2 to be analyzed by the four network sensors 46 labeled with the reference letter B. Similarly, the network traffic analyzer 48 may be configured so that network sensors C analyze network traffic associated with server group 3, and network sensors D analyze traffic associated with server group 4.

Referring again to the network traffic analyzer 48 in FIG. 6, in one embodiment of the invention, each of data hubs 1, 2, 3 and 4, forwards network traffic to a different network sensor 50 group. For example, the four network sensors 50 connected to data hub 1 (e.g., the network sensors labeled with reference letter A) may analyze network traffic for a particular type of network intrusion. Accordingly, data switching devices 1, 2, 3 and 4 may be configured to forward to data hub 1 a particular type of network traffic associated with the particular type of analysis performed by network sensor A. Similarly, the network sensors connected to data hub 2 may analyze network traffic to detect a type of network intrusion that is different from the type that the network sensors labeled with reference letter A are configured to detect. Consequently, data switching devices 1, 2, 3 and 4, may be configured to forward all network traffic that is associated with the particular type of network intrusion detected by network sensor B to data hub 2.

In one embodiment of the invention, the data switching devices 1, 2 3 and 4 may be configured to sense when one or more of the network sensors 46 and 50 has failed. In response, the data switching device may be configured to re-route the network traffic away from the failed, or failing, network sensor to a failover group of network sensors. This is particularly advantageous when a network intrusion is directed at one or more network sensors.

Figure 7:
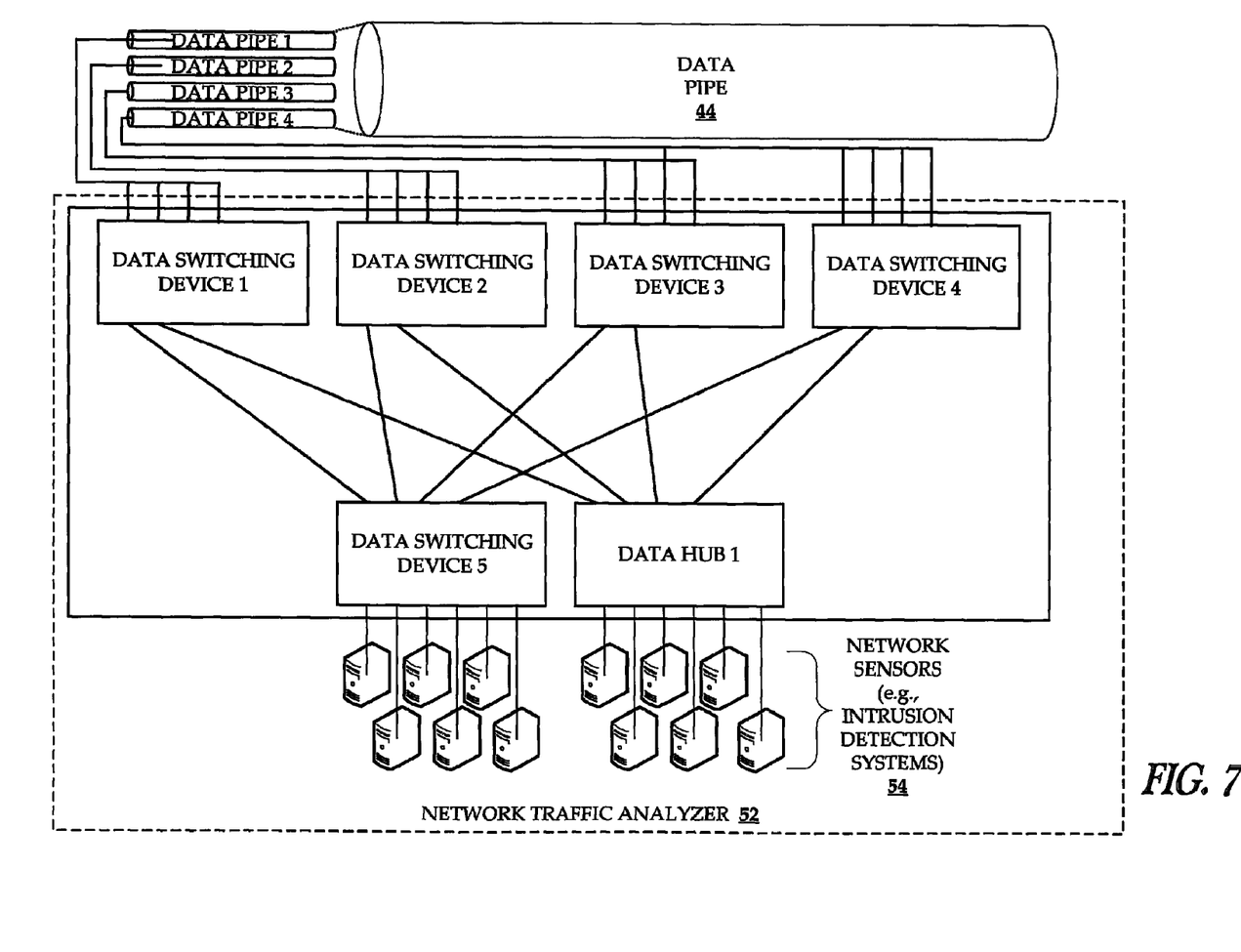

FIG. 7 illustrates an example of a network traffic analyzer 52, according to an alternative embodiment of the invention. The network traffic analyzer 52 illustrated in FIG. 7 is similar to those shown in FIGS. 5 and 6, however, the network traffic analyzer 52 illustrated in FIG. 7 includes a data switching device (e.g., data switching device 5) in addition to a data hub. In one embodiment of the invention, one or more data switching devices (e.g., data switching device 5) may be used in place of one of one or more data hubs. This particular embodiment of the invention allows for yet another layer of intelligent routing and forwarding to occur. For example, data switching device 5 may be configured to forward or route network traffic to one or more of the plurality of attached network sensors 54. In one embodiment, the data switching device 5 may be configured to sense when one or more of the attached network sensors 54 has failed, and in response, re-route network traffic to a failover network sensor. Although the network traffic analyzer 52 shown in FIG. 7 includes one data switching device and one data hub (e.g., data switching device 5 and data hub 1) at the second level, the invention is not dependent upon this exact number of data switching devices and data hubs, and in alternative embodiments, may include any number, and any combination, of data switching devices and data hubs that fulfills the requirements of the online enterprise.

Figure 10:
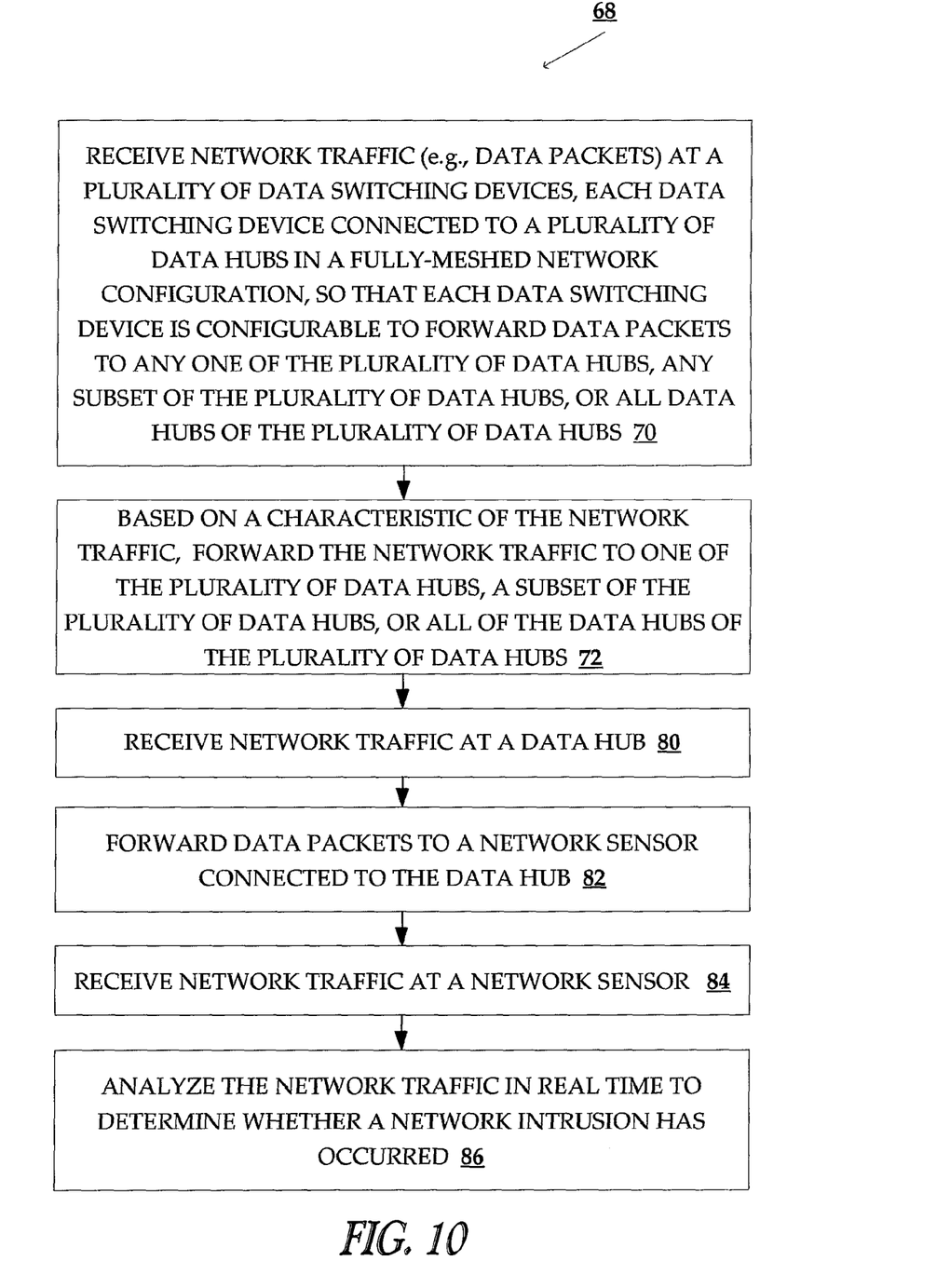
FIG. 10 illustrates a method for analyzing network traffic, according to one embodiment of the invention.

FIG. 10 illustrates a method 68 for analyzing network traffic, according to one embodiment of the present invention. At operation 70, network traffic (e.g. data packets) is received at a network traffic analyzer including a plurality of data switching devices. Each of the data switching devices is connected to a plurality of data hubs in a fully meshed network configuration so that each data switching device is configurable to forward, or route, network traffic to any one of the data hubs, any subset of the plurality of data hubs, or all of the data hubs of the plurality of data hubs.

At operation 72, the data switching devices forward, or route, the network traffic to one or more data hubs based on a characteristic of the network traffic. For example, in one embodiment of the invention, a characteristic of a data packet may be derived from any one or more of the layers of the seven-layer OSI model. In addition, a characteristic may be derived from a data flow including the content of a combination of data packets. For example, when multiple data packets are combined into a data message, the data packets that make up the data message may be routed based on the content (e.g., a URL) of the data message.

At operation 74, network traffic is received at a data hub. At operation 76, the network traffic is forwarded to one or more network sensors attached to the data hub. Accordingly, at operation 76, the network sensors receive the network traffic, and at operation 78, the network traffic is analyzed in real time for, among other purposes, detecting network intrusions.

Figure 11:
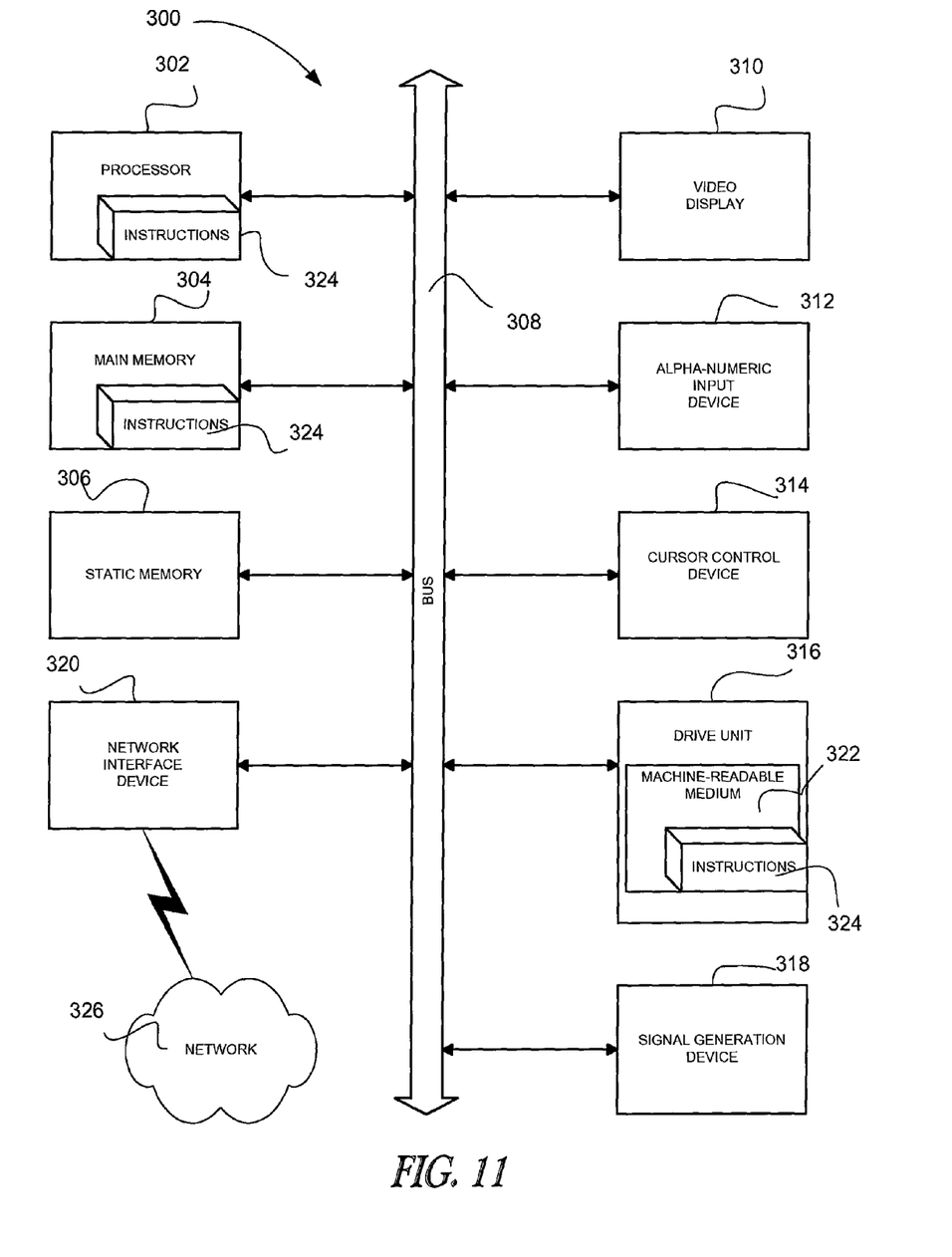
FIG. 11 shows a diagrammatic representation of a machine in the exemplary form of a computer system within which a set of instructions, for causing the machine to perform any one or more of the methodologies discussed herein, may be executed.

FIG. 11 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for analyzing network traffic have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to analyze network traffic, the system including:
a plurality of data switching devices connected to a plurality of data hubs in a fully meshed network configuration where each data switching device of the plurality of data switching devices is connected to every data hub of the plurality of data hubs,
each data switching device configurable to analyze data packets for one or more patterns indicating a type and, based on the one or more patterns indicating the type, forward the data packets to an input port of any one of (1) the plurality of data hubs, (2) any subset of the plurality of data hubs, and (3) all data hubs of the plurality of data hubs,
each data hub having multiple input ports and multiple output ports, and each data hub configured to broadcast all data packets received at any one of its input ports to every one of its output ports; and
one or more network sensors, each network sensor connected to an output port of a single data hub of the plurality of data hubs, and each network sensor configured to analyze the type of data packets.

2. The system of claim 1, wherein the one or more network sensors are configured to analyze data packets in real time to detect network intrusions.

3. The system of claim 1, further including:
a plurality of network sensors connected to the output ports of the plurality of data hubs, wherein each data switching device is configured to forward all data packets to all data hubs and each network sensor is configured to analyze data packets in real time.

4. The system of claim 3, wherein the plurality of network sensors are categorized into groups by function, and each network sensor within a particular group is connected to the same data hub of the plurality of data hubs.

5. The system of claim 3, wherein the plurality of network sensors are categorized into groups by function, and one network sensor from each group of network sensors is connected to the same data hub of the plurality of data hubs.

6. The system of claim 1, wherein each data switching device is configurable to discard some, or all, data packets based on a characteristic of one or more data packets.

7. The system of claim 1, wherein each data switching device is configurable to discard all data packets of a first type and forward all data packets of a second type to an input port of any one of (1) the plurality of data hubs, (2) any subset of the plurality of data hubs, and (3) all data hubs of the plurality of data hubs, the first type and second type determined by the characteristic of one or more data packets.

8. The system of claim 1, wherein the data switching device is a traffic management switching device and the characteristic of each data packet is derived from any one or more of layers two through seven of each data packet, wherein layers two through seven represent layers of the OSI seven-layer model.

9. The system of claim 1, wherein the data switching device is a traffic management switching device and the characteristic of the data packets is derived from the content of the combination of a group of related data packets.

10. The system of claim 1, wherein the system is connected to receive network traffic from a network-based ecommerce enterprise.

11. A method of analyzing network traffic, the method comprising:
receiving data packets at a plurality of data switching devices, each data switching device connected to a plurality of data hubs in a fully meshed network configuration where each data switching device of the plurality of data switching devices is connected to every data hub of the plurality of data hubs, so that each data switching device is configurable to forward data packets to any one of the plurality of data hubs, any subset of the plurality of data hubs, or all data hubs of the plurality of data hubs;
analyzing data packets for one or more patterns indicating a type,
based on the one or more patterns indicating the type, forwarding data packets to at least one of (1) the plurality of data hubs, (2) a subset of the plurality of data hubs, and (3) all data hubs of the plurality of data hubs;
receiving data packets at the plurality of data hubs, each data hub comprising multiple input ports and multiple output ports; and
broadcasting all data packets received at any input port of a data hub to all output ports of the data hub to forward the data packets to a plurality of network sensors, each network sensor connected to an output port of a single data hub, and each network sensor configured to analyze the type of data packets.

12. The method of claim 11, further including:
receiving data packets at the plurality of network sensors; and
analyzing the data packets in real time to determine whether a network intrusion has occurred.

13. The method of claim 11, further including:
upon determining a network intrusion has occurred, reporting the network intrusion to a system administrator.

14. The method of claim 11, wherein the plurality of network sensors are categorized into groups by function, and each network sensor within a particular group is connected to the same data hub of the plurality of data hubs.

15. The method of claim 11, wherein the plurality of network sensors are categorized into groups by function, and one network sensor from each group of network sensors is connected to the same data hub of the plurality of data hubs.

16. The method of claim 11, further including:
based on a characteristic of one or more data packets, discarding some, or all, data packets.

17. The method of claim 11, wherein the characteristic of a data packet is derived from any one or more of layers two through seven of each data packet, wherein layers two through seven represent layers of the OSI seven-layer model.

18. The method of claim 11, wherein the characteristic of the data packets is derived from the content of the combination of a group of related data packets.

19. A system for analyzing network traffic, the system comprising:
a plurality of first means for:
receiving data packets,
analyzing the data packets for one or more patterns indicating a type, and
selectively forwarding data packets, based on the one or more patterns indicating the type;
a plurality of second means for receiving data packets from first means, and for broadcasting all received data packets using every output of a plurality of outputs, the plurality of first means and the plurality of second means connected in a fully meshed configuration where each first means of the plurality of first means connected to every second means of the plurality of second means; and third means for receiving data packets from a single second means, each third means to receive data packets from one of the plurality of outputs of second means, and for analyzing the data packets of the type in real time to determine whether a network intrusion has occurred.

* * * * *